(12) United States Patent
Roberts

(10) Patent No.: US 7,196,694 B2
(45) Date of Patent: Mar. 27, 2007

(54) FORCE SENSORS AND TOUCH PANELS USING SAME

(75) Inventor: Jerry B. Roberts, Arlington, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 620 days.

(21) Appl. No.: 10/121,507

(22) Filed: Apr. 12, 2002

(65) Prior Publication Data

US 2002/0180710 A1 Dec. 5, 2002

Related U.S. Application Data

(63) Continuation-in-part of application No. 09/835,040, filed on Apr. 13, 2001.

(51) Int. Cl.
G09G 5/00 (2006.01)

(52) U.S. Cl. .................................. 345/173; 178/18.01

(58) Field of Classification Search ........ 345/173–179; 178/18.01–18.08; 341/34; 463/37; 382/313–314
See application file for complete search history.

(56) References Cited

U.S. PATENT DOCUMENTS

| | | | |
|---|---|---|---|
| 3,657,475 A | 4/1972 | Peronneau et al. |
| 4,089,036 A | 5/1978 | Geronime |
| 4,121,049 A | 10/1978 | Roeber |
| 4,340,777 A | 7/1982 | DeCosta et al. |
| 4,355,202 A | 10/1982 | DeCosta et al. |
| 4,389,711 A | 6/1983 | Hotta et al. |
| 4,484,179 A | 11/1984 | Kasday |
| 4,495,434 A | 1/1985 | Diepers et al. |
| 4,511,760 A | 4/1985 | Garwin et al. |
| 4,542,375 A | 9/1985 | Alles et al. |
| 4,550,384 A | 10/1985 | Kimura |
| 4,558,757 A | 12/1985 | Mori et al. |
| 4,675,569 A | 6/1987 | Bowman et al. |

(Continued)

FOREIGN PATENT DOCUMENTS

DE  92 03 286.9  6/1992

(Continued)

OTHER PUBLICATIONS

"Force Concentrator For Touch Sensitive Panel Using Snap-Action Switches," IBM Technical Disclosure Bulletin #NN7606238, vol. 19, Jun. 1976.

(Continued)

Primary Examiner—Richard Hjerpe
Assistant Examiner—Abbas Abdulselam
(74) Attorney, Agent, or Firm—Robert J. Pechman

(57) ABSTRACT

A touch screen uses one or more force sensors to determine location of the touch on the screen. The force sensor has an accurately determined direction of sensitivity and, therefore, has reduced sensitivity to forces that are non-perpendicular to the screen. The sensor is thin in relation to the area of the active force-sensing element, allowing low profile force touch screens to have a better combination of mechanical integrity, accuracy, sensitivity, and high signal to noise ratio than has heretofore been achieved. The sensor may also be rotationally soft, so that it is effective at preventing twisting motions of the overlay or the support surface from affecting the sensed force.

62 Claims, 7 Drawing Sheets

U.S. PATENT DOCUMENTS

| | | |
|---|---|---|
| 4,697,049 A | 9/1987 | Peemoller et al. |
| 4,745,565 A | 5/1988 | Garwin et al. |
| 4,771,277 A | 9/1988 | Barbee et al. |
| 4,775,765 A | 10/1988 | Kimura et al. |
| 4,816,811 A | 3/1989 | Bogatin et al. |
| 4,875,378 A | 10/1989 | Yamazaki et al. |
| 4,893,115 A | 1/1990 | Blanchard |
| 4,918,262 A | 4/1990 | Flowers et al. |
| 4,983,787 A | 1/1991 | Kunikane |
| 5,038,142 A | 8/1991 | Flower et al. |
| 5,072,076 A | 12/1991 | Camp, Jr. |
| 5,241,308 A | 8/1993 | Young |
| 5,376,948 A | 12/1994 | Roberts |
| 5,541,372 A | 7/1996 | Baller et al. |
| 5,543,588 A | 8/1996 | Bisset et al. |
| 5,563,632 A | 10/1996 | Roberts |
| 5,708,460 A * | 1/1998 | Young et al. ............... 345/173 |
| 5,714,694 A | 2/1998 | Diessner |
| 5,854,625 A | 12/1998 | Frisch et al. |
| 5,942,733 A * | 8/1999 | Allen et al. ............... 178/18.01 |
| 6,108,211 A | 8/2000 | Diessner |
| 6,373,265 B1 * | 4/2002 | Morimoto et al. .......... 324/686 |
| 6,492,979 B1 * | 12/2002 | Kent et al. ................... 345/173 |
| 6,850,229 B2 * | 2/2005 | Casebolt et al. ............ 345/173 |

FOREIGN PATENT DOCUMENTS

| | | |
|---|---|---|
| EP | 0 531 815 | 3/1993 |
| JP | 61148522 | 12/1984 |
| JP | 2001-282445 | * 10/2001 |

OTHER PUBLICATIONS

"Touch-Sensitive Pancake," IBM Technical Disclosure Bulletin #88A61790, Oct. 1998.

U.S. Appl. No. 09/835,049, filed Apr. 13, 2001, Tangential Force Control in a Touch Location Device.

U.S. Appl. No. 09/835,040, filed Apr. 13, 2001, Method and Apparatus for Force-Based Touch Input.

* cited by examiner

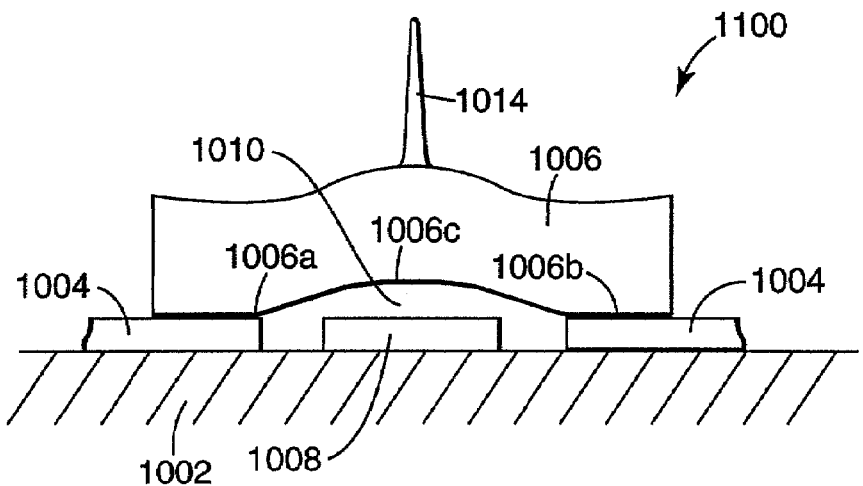
FIG. 10
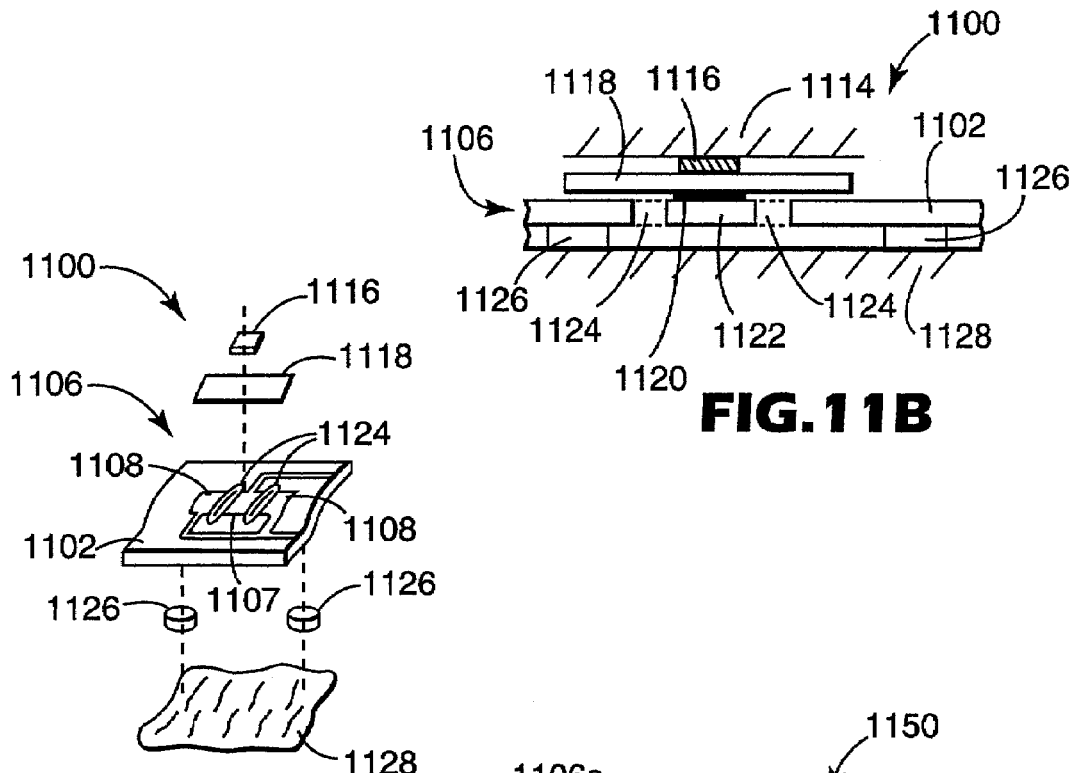
FIG. 11B
FIG. 11A
FIG. 11C

FORCE SENSORS AND TOUCH PANELS USING SAME

RELATED APPLICATIONS

This application is a continuation-in-part of U.S. application Ser. No. 09/835,040, filed on Apr. 13, 2001, which is incorporated herein by reference.

FIELD OF THE INVENTION

The present invention is directed to a force sensor and more particularly to a force sensor that is useful for determining the force applied to the touch panel of a touch sensitive display.

BACKGROUND

A touch screen offers a simple, intuitive interface to a computer or other data processing device. Rather than using a keyboard for data entry, a user can transfer information through a touch screen by touching an icon or by writing or drawing on a screen. Touch screens are used in a variety of information processing applications. Transparent touch screens, used over an information display such as a liquid crystal display (LCD) or cathode ray tube (CRT), are particularly useful for applications such as cellphones, personal data assistants (PDAs), and handheld or laptop computers.

Various methods have been used to determine touch location, including capacitive, resistive, acoustic and infrared techniques. Touch location may also be determined by sensing the force of the touch on the touch screen using force sensors coupled to a touch surface. Touch screens that operate by sensing touch force have several advantages over the other technologies mentioned above. Electrically based approaches, such as resistive and capacitive approaches, require a complex touch surface overlay that uses special materials and multiple layers to ensure good electrical properties across the screen while also maintaining good optical transmission through the screen. The overlay of a force-based touch screen, on the other hand, may be formed from a simple, single sheet of material. Further, force sensors do not rely on a lossy electrical connection to ground, as required by a capacitive touch screen, and can be operated by a finger touch, gloved hand, fingernail or other nonconductive touch instrument. Unlike surface acoustic wave technology, force sensors are relatively immune to accumulations of dirt, dust, or liquids on the touch surface. Finally, a force sensor is less likely to detect a close encounter as an actual touch, which may be a problem with infrared and capacitive touch screens.

Forces detected by touch screen force sensors reflect a variety of static and dynamic factors in addition to the touch force. These factors may be considered noise sources with respect to the touch signal. Noise may be introduced through the touch screen electronics, or it may be mechanical in nature. Electrical noise may be introduced, for example, in the sensor, amplifier, data conversion or signal processing stages. Mechanical noise may arise from various mechanical effects, such as vibration, flexure, movement, and the application of forces that are non-perpendicular to the touch screen. In addition, the touch screen force sensors may be affected by the weight of the touch surface and preloading forces applied to the force sensors during manufacture.

SUMMARY OF THE INVENTION

Generally, the present invention relates to a type of force sensor that has a more accurately determined direction of sensitivity and, therefore, has reduced sensitivity to forces that are non-perpendicular to the touch screen. Furthermore, the sensor is thin in relation to the area of the active force-sensing element, allowing low profile force touch screens to have a better combination of mechanical integrity, accuracy, sensitivity, and high signal to noise ratio than has heretofore been achieved. The sensor may also be rotationally soft, which means that it is effective at preventing twisting motions of the overlay or the support surface from affecting the sensed force.

In one particular embodiment, the invention is directed to a device for determining the position of a force applied to a touch screen. The device includes a touch member, a base support and a coupling unit coupling between the touch member and the base support. The coupling unit includes a beam member connected at peripheral portions to respective beam member supports. A center portion of the beam member is substantially unsupported relative to the peripheral portions. A force path passes force between the touch member and the base support. The force path passes between the center portion of the beam member and the peripheral portions of the beam member. There is at least one sensor element that detects signal indicative of a force at the beam member location due to the touch force.

Another embodiment of the invention is directed to a method of detecting the location of a touch on a touch screen having a touch member. the method includes passing at least a portion of a force applied to a first side of the touch member to one of i) a center portion of a force spreader disposed on a second side of the touch member, the center portion of the force spreader being substantially unsupported, and ii) peripheral portions of the force spreader. The method also includes spreading the portion of the applied force from the one of the i) the center portion of the force spreader and ii) the peripheral portions of the force spreader to the other of i) the center portion of the force spreader and ii) the peripheral portions of the force spreader. A signal indicative of the portion of the applied force passed to the force spreader is sensed.

Another embodiment of the invention is directed to a system for detecting the location of a force applied to a first side of a touch member. The system includes means for passing at least a portion of a force applied to a first side of the touch member to a center portion of a force spreading means for spreading the portion of the applied force disposed on a second side of the touch member. The center portion of the force spreading means is substantially unsupported. The force spreading means passes the portion of the applied force between the center portion and the peripheral portions of the force spreading means. There is also a means for measuring a signal indicative of the portion of the applied force passed to the force spreading means.

Another embodiment of the invention is directed to a touch panel system for determining the location of a touch on the touch panel. The system includes a base support and a touch member coupled to the base support via coupling units. At least one of the coupling units includes a beam member connected at peripheral portions to respective beam member supports. A center portion of the beam member is substantially unsupported relative to the peripheral portions. A force path passes force between the touch member and the base support. The force path passes between the center portion of the beam member and the peripheral portions of the beam member. There is at least one sensor element disposed to measure a signal indicative of a force passing through the beam member location due to the touch. A touch panel controller is coupled to receive detection signals from the plurality of force sensor units and to determine a location of a touch on the touch panel.

Another embodiment of the invention is directed to a device for locating the position of a touch on a touch screen. The device includes a touch member, a receiving structure and a force spreading member. The force spreading member has a concentrated force receiving region coupled to receive a force passed into the force spreading member from the touch member. The force spreading member also has a force distributing region to pass the force out of the force spreading member to the receiving structure. The distributing region has a larger area than the force receiving region. The receiving structure and force spreading member are arranged so that changes in curvature of the force spreading member arising from the force maintain loading of the force spreading through the force spreader while the force remains within a measurement range, so as to spread the force within the spreading member to substantially all of the distributing region. A sensing element is disposed to detect the force passing through the force spreading member.

Another embodiment of the invention is directed to a system for locating a touch on a touch screen. The system includes a touch member, a base support, and a coupling assembly coupled between a coupling region of the touch member and the base support. The coupling assembly is rotationally unconstrained relative to one of the touch member and the base support. The coupling assembly includes a beam member having a predominant plane. The beam member has a first region coupled to receive force from the touch member. The beam member also includes at least one second region. The beam member receives the force in a direction perpendicular to the predominant plane and passes the force laterally to the at least one second region. The force passes out of the beam member through the at least one second region towards a beam member support of the coupling assembly. A sensor element is responsive to the force perpendicular to the predominant plane.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 10 schematically illustrates another embodiment of a capacitive type of beam loading force sensor according to the present invention;

FIGS. 11A–11C schematically illustrate another embodiment of a capacitive type of beam loading force sensor according to the present invention;

Figure 1:
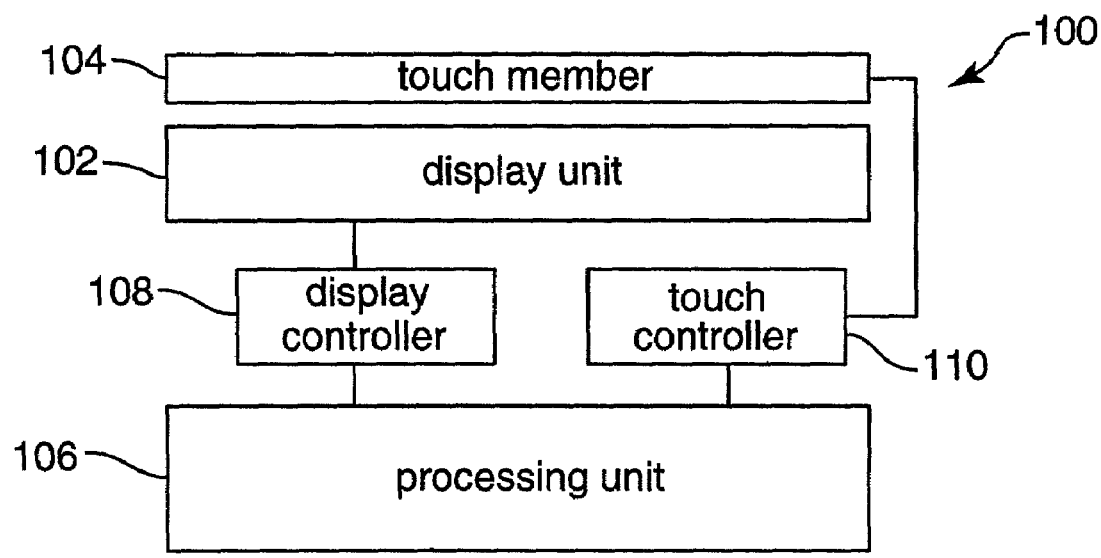
FIG. 1 shows a block schematic of a display device according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to touch sensing techniques and is believed to be particularly useful for producing force sensors that are less sensitive to tangential forces that may lead to mis-reading the location of the touch. Furthermore, the present invention is believed to lead to force sensors that are thin in relation to the active area of the force sensing element, which assists in the construction of accurate, low-profile touch sensing devices.

A touch screen using a force sensor of the present invention may be used in a desktop, handheld or laptop computer system, a point-of-sale terminal, personal data assistant (PDA), or a cell phone. Although described in combination with a microprocessor-based system, the touch screen device of the present invention may be combined with any logic-based system, if desired. In determining the location of a touch on a touch screen, a touch signal representing the force of a touch acting on the touch screen is produced by one or more force sensors located proximate to a touch surface of the touch screen. Where a touch screen is rectangular in shape, force sensors are typically disposed at each of the four corners of the touch screen. A touch signal may be derived from a single sensor, or by combining component touch signals from two or more force sensors. Determination of the touch location requires analysis of the component force signals produced by the different force sensors.

A device 100 that includes some basic components of a touch display is illustrated in FIG. 1. A display unit 102, for example a liquid crystal display (LCD) or cathode ray tube (CRT), is disposed below a touch member 104. The display unit 102 is coupled to a processing unit 106 and displays information received from the processing unit 106 via a display controller 108. The display controller 108 may be part of the processing unit 106. The location of a touch on the touch member 104 is determined by the touch screen controller 110, which may be part of the processing unit 106. The touch screen controller 110 receives signals related to the component forces sensed by the different force sensors. These signals are then analyzed to determine the location of the touch relative to the positions of the different force sensors. Therefore, the processing unit 106 may be enabled to determine the position of a touch on the touch member 104 relative to an image displayed on the display unit 102, and determine the meaning of the user's input. It is important that the location of the touch on the touch member 104 be determined with as little error as is needed to ensure that the processing unit 106 receives the desired information from the user.

Force sensors typically detect some movement that occurs in response to the applied force. For example, the elements of a strain gauge stretch under application of a force, and the electrical characteristics of a piezoelectric or piezoresistive sensor change when the sensor element is compressed or stretched. Furthermore, in a capacitive sensor element, one capacitor plate is moved in relation to another capacitor plate upon application of a force. Therefore, while a sensor may be referred to as a displacement sensor, it will be appreciated that a measurement of displacement may be used to provide an estimate of the applied force that resulted in the measured displacement, even if the displacement itself is microscopic in magnitude.

Figure 2:
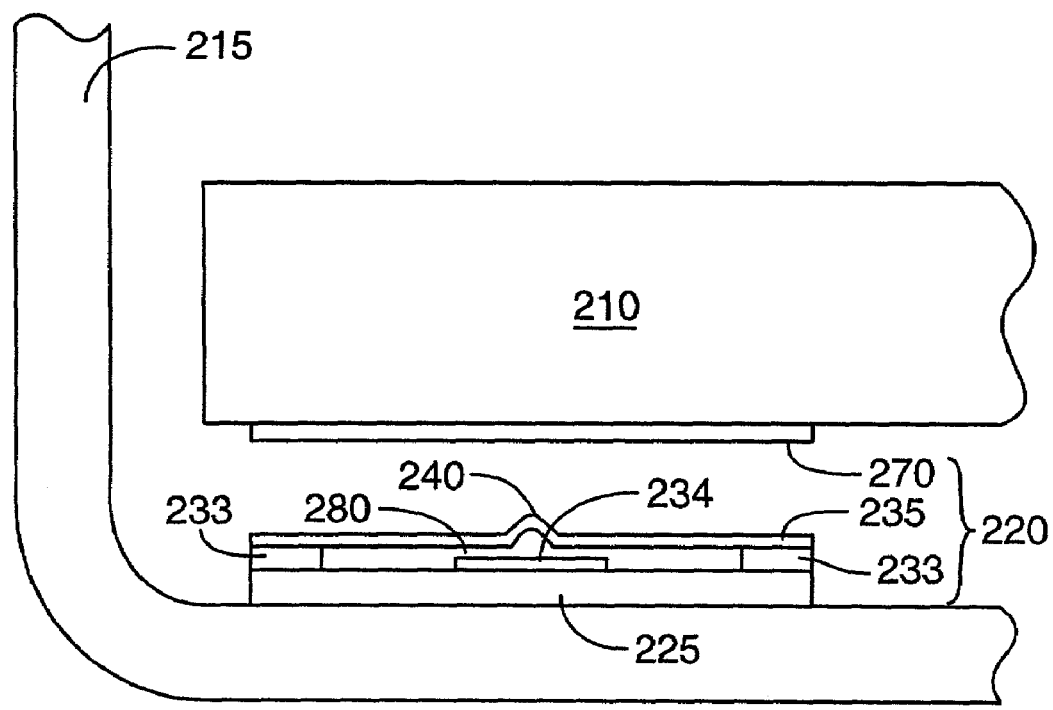
FIG. 2 schematically illustrates a partial cross-section through a force-based touch sensor, according to an embodiment of the present invention.

One particular embodiment of a force sensor appropriate for use in touch screen applications is described in U.S. patent application Ser. No. 09/835,040, filed on Apr. 13, 2001, entitled "Method and Apparatus for Force-Based Touch Input," which is hereby incorporated by reference. The force sensor is appropriate for use with a liquid crystal display (LCD), cathode ray tube (CRT) or other transparent display, and is schematically illustrated in FIG. 2. In this particular embodiment, the sensor measures the applied force based on the change of capacitance of a capacitive element.

A touch panel 210, or overlay, is located within a frame or housing 215. This may be provided with a large central aperture (not shown) through which the display may be viewed. Further, the overlay 210 may be transparent to allow such viewing. If desired, the undersurface of housing 215 may be seated directly against the surface of such a display, over the border surrounding its active area. In another embodiment, as mentioned above, the overlay may be replaced by a structure including a display unit, such as an LCD. A capacitive sensor 220 may be positioned between the overlay 210 and the housing 215.

An interconnect 225 with attachment lands 233 may be coupled to the housing 215 by soldering, cementing, or by other known methods. A conductive area forms a first conductive element 234 on the interconnect 225. A second conductive element 235 with a central dimple 240 may be attached to the lands 233 of the interconnect 225 by soldering, for example. A small gap 280 is formed between the first conductive element 234 and the second conductive element 235, either by the shape of the second conductive element 235, or by the process of attaching the second conductive element 235 to the interconnect 225. The width of the gap 280 may be approximately 0.025 mm, for example. A capacitor is formed by the conductive elements 234, 235 separated by the gap 280.

A bearing surface 270 may be interposed between the touch panel 210 and the second conductive element 235. This may protect overlay 210 from indentation or damage by the dimple 240, especially in cases where the overlay 210 is made of softer material. The bearing surface 270 may also mount to overlay 210 through a thin layer (not shown) of elastomer or of highly pliable adhesive, thereby providing a lateral softening function. In normal operation, the overlay 210 or bearing surface 270 is in contact with the dimple 240: these elements are shown separated only for clarity in the drawing.

The second conductive element 235 combines the functions of a spring and a capacitor plate. As a perpendicular force is applied to the surface of the touch panel 210, the second conductive element 235 flexes, decreasing the width of the gap 280 and increasing the capacitance of the sensor 220. This change in capacitance may be measured and related to the force applied to the touch panel 210. Although a touch screen using capacitive force sensors is described, other types of force sensors may be used in a similar manner, including, for example, piezoelectric sensors and strain gauge sensors.

One of the advantages of a force-based touch screen is that the number of optically distinct layers positioned between the display unit and the user is low. Typically, the overlay positioned over the display unit is a single layer of glass or relatively stiff polymer, for example polycarbonate or the like, which may be chosen for best optical qualities. This contrasts with other types of touch screen, such as resistive or capacitive touch screens that require several potentially lossy layers over the display unit. The electrically conductive thin films required in resistive or capacitive touch screens typically have a high index of refraction, leading to increased reflective losses at the interfaces. This is a particular problem in resistive screens where there are additional solid/air interfaces, and where antireflection coatings may be less useful, since the conductive layers must be able to make physical contact. A force screen overlay, however, has only its upper and lower surfaces; these may be treated to reduce reflective losses and to reduce glare. For example, the overlay may be provided with matte surfaces to reduce specular reflection, or may be provided with anti-reflection coatings to reduce reflective losses.

Rather than covering a display, the overlay 210 itself may include an image-producing screen, for example a liquid crystal display. Such a display comprises a number of layers that together form the overlay 210. In such a case, the user presses on the screen itself and the resulting component forces applied at the different force sensors are detected and resolved to determine the location of the touch on the screen.

The term "rotational softening" relates sensor's insensitivity to a twisting motion of the overlay or the support. Rotational softening is a particularly important characteristic for a force sensor to have when at least one of the overlay and the underlying support is flexible. On the other hand, rotational softening is less important when both the overlay and the underlying support are very rigid. Rigidity, however, results from the use of large amounts of material, and so a rigid structure is both large and heavy. It is more desirable, however, that the touch display be light and compact, and so it is important to be able to account for the effects that arise due to the increased flexibility of the touch screen structure. Accordingly, the use of a force sensor that includes rotational softening permits the touch display to be thinner and lighter. The term "rotationally unconstrained" may be used to indicate that the base support and the overlay are able to rotate relative to one another over at least an operational range of angles.

The flexing of a display and the importance of rotational softening to reduce the possible adverse effects on the determination of the touch location are further described with reference to FIGS. 3A and 3B, which discuss the application of a moment, resulting from a twisting motion, to a force sensor.

Figure 3A:
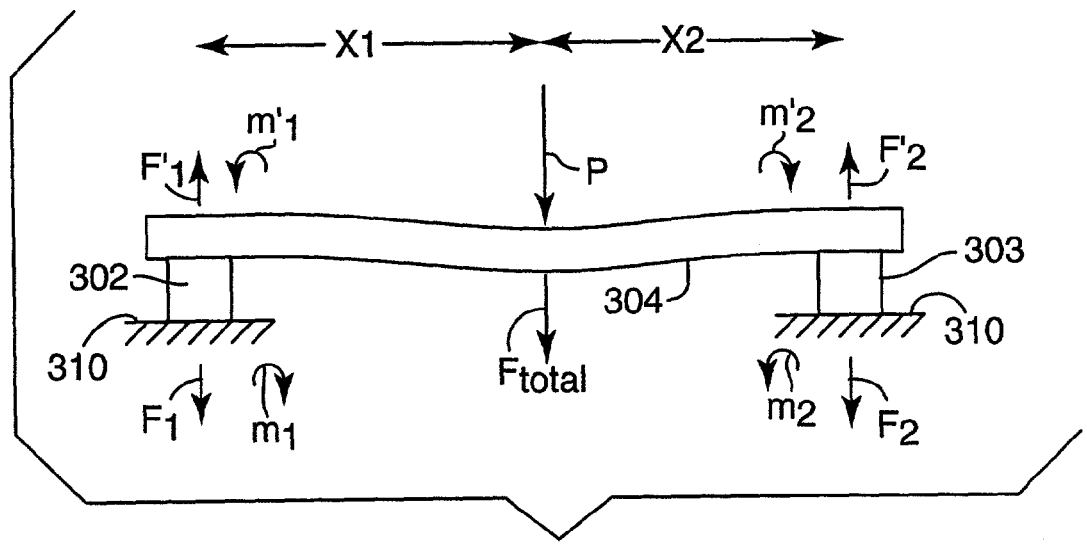
FIG. 3A schematically illustrates the application of forces to force sensors when the sensors are rigidly attached to the overlay and the frame.

In the schematic illustration of FIG. 3A, an overlay 304 is supported between two sensor assemblies 302 and 303. The overlay 304 is pliable in that it is not completely rigid and may flex in response to an applied force, particularly a force applied at a point distant from a support. The sensor assemblies 302 and 303 are rigid: the sensor assemblies may be formed, for example, using a piezoelectric element. The sensor assemblies 302 and 303 transmit both force and moment to the supports 310. The operator presses on the overlay 304 with a force $F_{total}$. A force $F_1$ passes to the support 310 through the first sensor assembly 302 and a force $F_2$ passes through the second sensor assembly 303 to the support 310. In equilibrium, $F_{total}=F_1+F_2$. Reaction forces $F_1'(=-F_1)$ and $F_2'(=-F_2)$ develop moments about point P where the force is applied. Due to the rotational stiffness of the sensors, a moment $m_1$ may pass through the first sensor 302 and a moment $m_2$ may pass through the second sensor 303.

In equilibrium, the moments and forces conform to the condition:

$$F_1 x_1 - m_1 = F_2 x_2 - m_2 \quad (1)$$

where $x_1$ is the distance from the first sensor 302 to the point P, and the distance $x_2$ is the distance from the second sensor 303 to the point P.

It should be noted that in the equations presented herein, the variables are be represented by their positive magnitudes, although other sign conventions are possible.

Although a straightforward force-sensing touch location device develops no signals directly representative of $m_1$ or $m_2$, these moments do affect the force signals produced by the sensors 302 and 303. Indirect methods of attempting to estimate or correct for these moments may be implemented. Such methods are complex and difficult to implement. Without implementing such methods, however, location calculations may be subject to serious error.

Figure 3B:
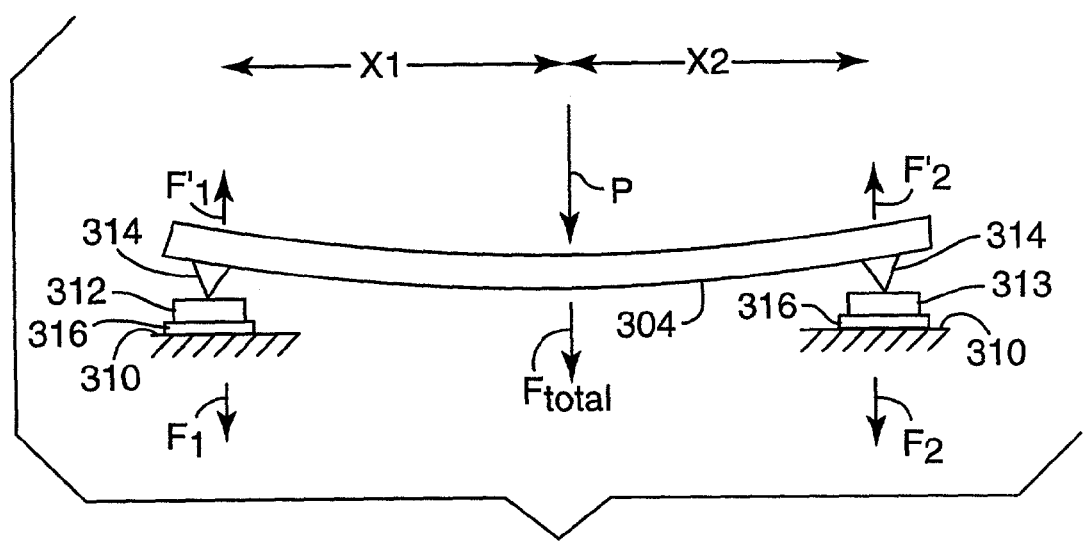
FIG. 3B schematically illustrates the effect of rotational softening when applying force to a flexible overlay, according to an embodiment of the present invention.

Another approach to measuring touch location, that includes rotational softening, is schematically illustrated in FIG. 3B. In this approach, the flexible overlay 304 is supported between two sensors 312 and 313. The sensors may be any type of sensor that detects an applied force, for example, a piezoelectric sensor, capacitive displacement sensor, piezoresistive sensor, strain gauge sensor or the like. There is a rotationally free bearing 314 between the overlay 304 and each sensor 312 and 313. There may also be a lateral softener 316 between, for example, support 310 and the sensors 312 and 313. The lateral softener 316 may be formed of a material that permits easy lateral elastic motion, so that tangential forces are not transmitted through the sensors 312 and 313 to the support 310. The lateral softener is described further in U.S. patent application Ser. No. 09/835,049, incorporated herein by reference.

Application of $F_{total}$ by the user at the point P on the overlay 304 results in forces $F_1$ and $F_2$ being applied through the sensors 312 and 313 respectively to the support 310. Reaction forces $F_1'=-F_1$ and $F_2'=-F_2$ develop moments about point P. Since the rotationally softened sensors assemblies 312 and 313 pass no moments directly, the moments developed by $F_1'$ and $F_2'$ about P must be the total moment about P and, when in equilibrium, this is zero. Thus, we may write the equation:

$$F_1 x_1 = F_2 x_2 \quad (2)$$

Finding the position of the touch is, therefore, possible by calculating the appropriate ratios of combinations of measured forces. With significant flexibility present in the overlay, or other supported display or structure, however, the applicability of this simple relation depends upon use of the rotational softening. Rotational softening may be implemented by using a pivot, rotational bearing or the like to permit the axis of the sensor to rotate relative to at least one of the overlay and the support. Rotational softening is discussed further in TOUCH SCREEN WITH ROTATIONALLY ISOLATED DISPLACEMENT SENSOR, filed on even day herewith, by J. Roberts, U.S. patent application Ser. No. 10/121,516, which is incorporated herein by reference.

Rotational softening may entail passing force to a force sensor through a very small area, such as a bearing point. Such force may need to be spread out again, to pass through a larger area of force-sensing material or structure. This need may be difficult to reconcile with other desirable properties of the force-sensing assembly.

a) It may be desired that the force sensing assembly be as thin as possible. In a small hand-held device, for instance, a force sensing assembly more than 20 mils thick may add objectionable thickness to the overall product.

b) It may be desired that the force sensing assembly have sufficient area to be easily manufactured and handled, and to pass working forces without excessive stress. A preferred minimum dimension, other than thickness, may, for instance, be on the order of 0.125" (3 mm); and c) It may be desired that the force sensing assembly respond only to the perpendicular component of force passing through, to maintain accurate touch location.

Perpendicular force passing through the potential force sensing region has an associated stress pattern. While it is not necessary that this pattern be highly uniform, it may need to be distributed over a sufficiently large area within the potential force sensing region to avoid damage, overload, or inadequate sensitivity. While it is preferable for the stress to scale linearly with the applied perpendicular force component, it is important that it have a relationship that is one to one and repeatable. This may be achieved even if contributions from different portions of the sensing region are weighted unevenly in the overall sensor output. It may be necessary, however, for the pattern of stresses sensed not to vary with the tangential force component. Such variation would require that opposing effects from different portions of the sensing region cancel exactly, a requirement incompatible with any but the most even weighting.

Figure 4A:
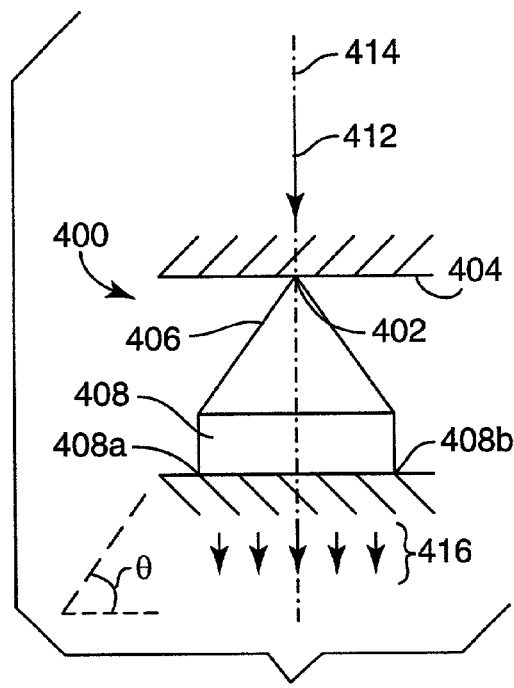
FIGS. 4A and 4B schematically illustrate the distribution of forces arising from the use of a conventional force spreader when a force is applied in a direction perpendicular to the touch surface.

One type of sensor assembly 400 is schematically illustrated in FIG. 4A. In this case, rotational softening is due to a pivot 402 that contacts the overlay 404. A force spreader 406 conducts forces from the overlay 404, through the force sensor element 408, to the support surface 410. The sensor element 408 may be, for example, a piezoelectric sensor. A force 412 that is applied in a perpendicular direction along a line of action 414 produces an even compressive stress distribution 416 in the sensor element 408. A line from the pivot 402 to the edge 408*a* of the sensor element 408 forms an angle θ with the support surface 410. The force spreader 406 is assumed to be symmetric, and so a line from the pivot 402 to the other edge 408*b* of the sensor element 408 also forms an angle θ with the support surface 410. More generally, an effective angle θ may be drawn to encompass only the potential force sensing region through which the bulk of the force passes. In this instance, that is essentially the angle drawn from edge 408*a* or 408*b*.

Figure 4B:
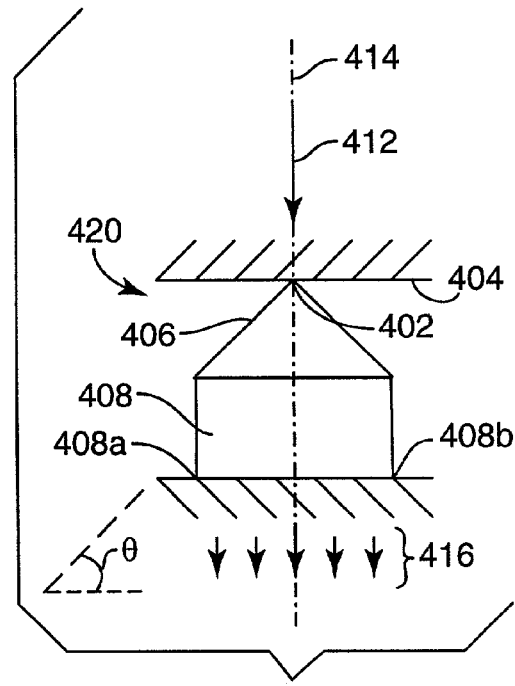

In the embodiment of a force sensor assembly 420 illustrated in FIG. 4B, the force spreader 406 has a thinner aspect than that in FIG. 4A. This force spreader may still yield an even force distribution 416 for a perpendicularly applied force 412, where the force spreader 406 is formed of a material having a substantially higher modulus than the force sensing element 408 and if the force sensing element 408 is relatively thick compared to its width. In practice, either the force spreader 406 or the sensor 408 must be thick, and thus the angle, θ, is quite large, if the force distribution 416 is to be approximately even. As both become thinner together, force becomes more and more centrally concentrated, and may pass through only a small fraction of the sensor area.

Figure 5A:
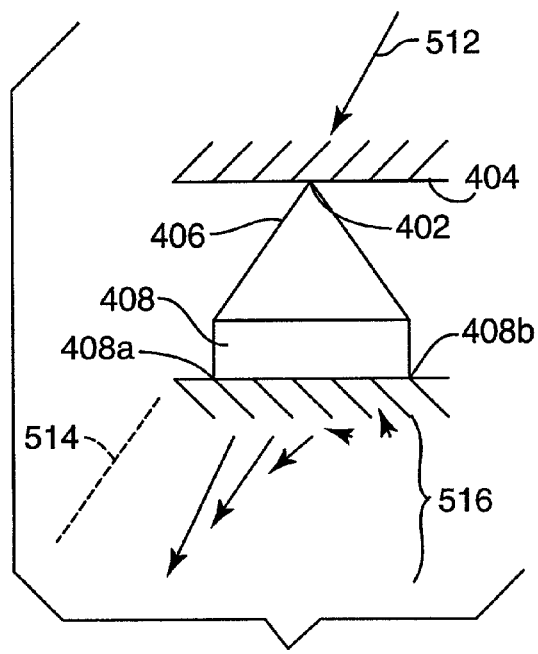
FIGS. 5A and 5B schematically illustrate the distribution of forces arising from the use of a conventional force spreader when a force is applied in a direction non-perpendicular to the touch surface.
Figure 5B:
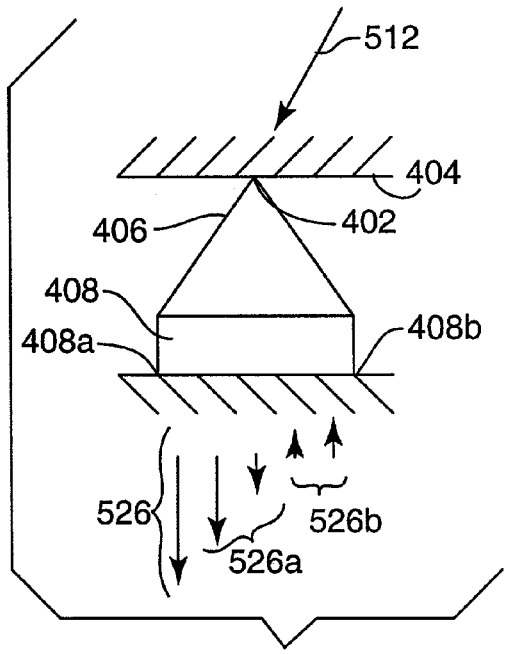

FIG. 5A schematically illustrates the case where the applied force 512 is about 30° from vertical, and the line of action 514 passes through the edge 408*a* of the force sensor element 408. Under such circumstances, the other edge 408*b* of the sensor element 408 may lift off the support surface 410 if the sensor element 408 is not affixed to the underlying support surface 410. This would lead to the force distribution becoming an impulse at location the position 408*a*.

Where the sensor element 408 is fixed to the support surface 410, as in the illustration, the presence of the force spreader 406 and the resulting continuity of deformation produce the force distribution 516. Since the forces are not all perpendicular to the support surface 410, the force distribution 516 includes a steady lateral component of shear. This shear component is omitted from the force distribution 526 illustrated in FIG. 5B, which otherwise shows the same as FIG. 5A. It may be presumed that the sensor element is only responsive to the perpendicular forces, and so the force distribution may be considered without the shear component. According to the force distribution 526, the moment about edge 408*a* of the force components 526*a* is balanced by the tensile forces 526*b*. Consequently, the force distribution 526 is very uneven.

It is difficult to provide an accurate response to the net force where unpredictable tangential force components variably produce such extreme distributions. The level of variation needs to be reduced to achieve a given level of accuracy, if sensors are to be used that have a practicable degree of uniformity of response and/or a practicable uniformity of integrating electrical connection. The overall dimensions of the sensors in FIGS. 4 and 5 may be reduced in an attempt to achieve low enough height. This may not be practical, however, as the result may be too tiny to manufacture and mount properly, and too fragile to survive operating conditions. Such overall reduction also leaves θ, and thus potential tangential force sensitivity, unchanged.

Since the variation in the sensor load distribution is strongly dependent on the angle θ, other approaches may be used to reduce the angle θ.

The use of a thin force spreader and a thin sensor element does not provide a good solution. The problem with this approach is that a thin force spreader cannot transport the centrally applied force laterally over a thin sensing layer. To do so, the thin force spreader must flex in response to the moment of the force carried, but such flexure is resisted by the fact that the underlying material has nowhere to go. The result is that the force distribution is concentrated, and is not spread out over the entire width of the sensor element. Although, under changing angles of applied force, this distribution moves less in absolute terms than before, it still moves a great deal in relation to its own width. Thus the uniformity of response problem remains.

Figure 12A:
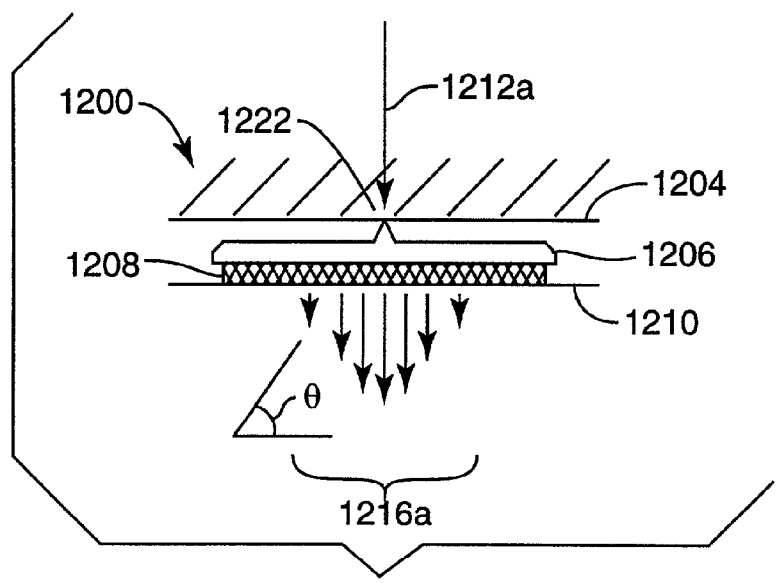
FIGS. 12A and 12B schematically illustrate the load distribution of a thin force sensor under a force applied at different angles.
Figure 12B:
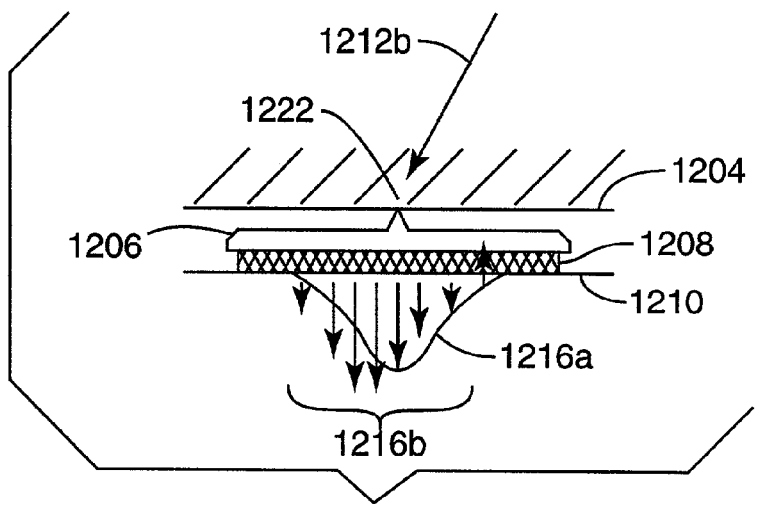

This problem may be better understood with reference to FIGS. 12A and 12*b*. In FIG. 12A, a force sensor 1200 has a force spreader 1206 and sensor element 1208. The application of a force 1212*a* produces a compressive stress distribution 1216*a*. The stress distribution 1216*a* is centrally concentrated due to the thin aspect of spreader 1206 and element 1208. As a result, the effective angle θ is still quite large.

Tangential force exerts a moment proportional to the height of the pivot point 1222 above the center of the element 1208, which moment must be balanced by an opposing pair of perpendicular forces that tend to develop at a lateral distance near the limits reached by the force distribution. The ratio of these uneven forces to the tangential force is thus proportional to the ratio of the height of pivot point 1222 to this lateral distance, i.e. to the tangent of θ.

That the high value of θ here indicates a continuing problem with a variable distribution is confirmed in FIG. 12B. An applied angled force 1212*b* generates a force distribution 1216*b*. Although this has shifted only modestly in absolute terms, comparison with the distribution 1216*a* reveals that, point by point, large relative changes in force have indeed taken place.

In addition to the continuing high potential sensitivity to tangential force, it may also be seen that the concentrated distributions 1216*a* and 1216*b* make inefficient use of sensor element 1208, and may locally overload it.

Returning briefly to FIG. 4B, force sensing element 408 is again of low modulus and low aspect ratio. It is functionally equivalent, though, to a thin, high modulus sensing element stacked above or below a thicker block of low modulus material serving as a cushion. Placing the cushion between the force spreader and the sensing element seems to offer little benefit above the relaxed choice of sensor material. Placing the sensing element between the force spreader and the cushion, however, can significantly reduce the effective value of θ.

Figure 13:
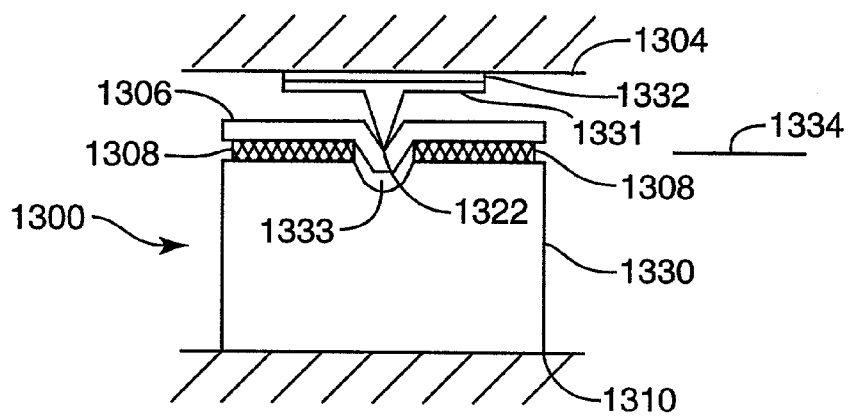
FIG. 13 schematically illustrates another embodiment of a force sensor.

In FIG. 13, an embodiment of a force sensing assembly 1300 includes a cushion 1330. An applied touch force passes from the touch member 1304 into a pivot element 1331, through a highly pliable, low modulus layer 1332, that may, for instance, comprise pressure sensitive acrylic adhesive. From the pivot point 1322, the touch force then passes in sequence into the spreader 1306, the force sensing element 1308, the low modulus cushion 1330, and the support 1310. The element 1308 and the cushion 1330 are provided with a hole or cavity 1333, as necessary to provide clearance for the central depression in the spreader 1306. This depression allows the pivot 1322 to fall in the neutral plane 1334 of the sensing element 1308, whereby the value expected for θ approximates zero. Pliable layer 1332 equips pivot element 1331 with a self centering function, aiding assembly, and allowing alignment to be maintained during small thermal changes affecting the position of touch member 1304 over support 1310. Layer 1332 may also provide a lateral softening function as further described in U.S. patent application Ser. No. 09/835,049. This further reduces problems from sensor response to tangential touch force by diverting most of the tangential force along other paths.

In another variation of force sensor 1300, the spreader 1306 may be replaced with a spreader that resembles spreader 1206. Pivot element 1331, layer 1332, cavity 1333, and any hole in sensing element 1308 may all then be omitted. It will be appreciated that the resulting value of θ, although no longer nominally zero, is still small.

In sensor 1300, it may be seen that the effective distribution of force to all of element 1308 relies on the presence of cushion 1330; thus the overall sensor assembly is still fairly thick. If the cushion is made too thin, or simply disposed of, the force may end up concentrated into an unacceptably small area just around the hole in sensing element 1308. If the hole is at the same time made as large as possible, however, adequate loaded sensing area may be maintained.

Figure 6:
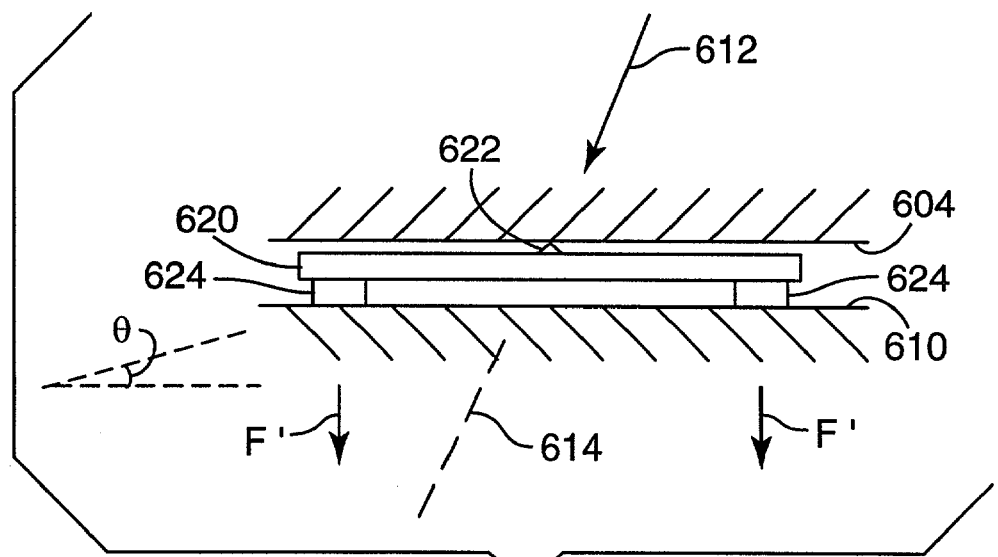
FIG. 6 schematically illustrates a peripheral loading force sensor according to an embodiment of the present invention.

Thus, an approach according to the present invention resolves both the question of excess thickness and the problem of lack of uniformity of response by transmitting the force laterally in a thin beam member before transferring the force to any structure below. One particular embodiment of such a sensor unit 600 is schematically illustrated in FIG. 6. The sensor unit 600 is disposed between the overlay 604 and the support surface 610. The force 612 is applied to the overlay 604 along the line of action 614.

A thin force spreading member 620, having a pivoting portion 622 contacted to the overlay 604 to provide lateral softening, passes the centrally received force to a force sensing material 624 disposed in regions at the periphery of the force spreading member 620. If the force spreading member 620 is in the form of a beam, then the force sensing material may be positioned at the ends of the beam. If the force spreading member 620 is in the form of a thin disk, then the force sensing material may be in the form of an annulus around the periphery of the disk, or at portions of the periphery of the disk. The force spreading member 620 may be referred to below as a beam, but it should be understood that the force spreading member may also take on other planar geometries, for example may be a disk, or may form a shape like a disk with certain portions removed, such as a cross, or other shape. The force sensing material 624 may be a piezoelectric material, piezoresistive material, or other material or device that has a measurable force responsive characteristic. While the width of sensor material 624 is not very great as seen in a sensor cross-section, material 624 may be extended around the entire periphery, or large parts of the periphery, of spreading member 620. Thus the force may be distributed over an adequate area of sensing material in total.

The force sensing material 624 may be integrated by its electrical connection to act as a single sensor. A very small effective value is achieved for angle θ, for example in comparison with the designs illustrated in FIGS. 4 and 5, thus the sensor loading depends almost entirely upon normal, rather than tangential force. Note that, depending upon the thickness and stiffness of the sensor material 624 and its mode of attachment above and below, the force distribution within the sensor material 624 may or may not be even, as there may be moments from any tendency toward clamped support of the beam. Irrespective of the actual shape of the force distribution, however, the force distribution is essentially constant in shape and position, scaling up and down linearly with the applied normal force, and hardly changing in shape and position in response to a tangentially applied force.

Figure 7:
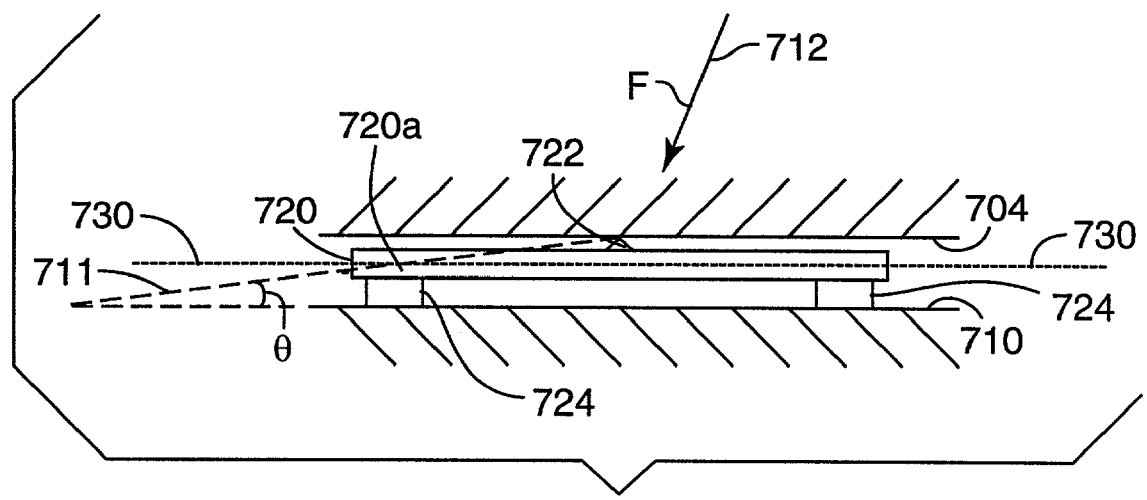
FIG. 7 schematically illustrates a beam loading force sensor according to another embodiment of the present invention.

The angle, θ, may be further reduced by employing the force spreading beam itself as part of the force sensing mechanism. An embodiment of a force sensor unit 700 that uses the force spreading beam 720 as part of the sensing mechanism is schematically illustrated in FIG. 7. The beam 720 is supported at its ends by supports 724 that are typically attached to the support surface 710. Pressing on the overlay 704 with a force 712, F, results in strain, flexure and/or deflection of the beam 720, any of which may be sensed to provide a signal indicative of the perpendicular force component passing through the sensor.

It will be appreciated that the strain, flexure and deflections of the beam 720 are almost entirely dominated by the perpendicular component of the applied force 712, F, irrespective of the angle of the applied force 712. A neutral plane 730 may be defined for the beam 720 when the beam 720. The line 711 passes from the pivot point 722 through the point 720a, in the neutral plane 730, above the support 724. The line 711 defines a small angle, θ, which is analogous to the values of θ defined above. The tangential force at the pivot point 722 produces a slight moment with respect to the neutral plane 730, which tends to slightly tip the surface of the beam 720 near its center. If beam deflection is sensed, for example capacitively as described above with respect to FIG. 2, slight errors may result if the gap between the beam 720 and the underlying electrode is not symmetrically spaced. The relative uniformity required to sustain a given level of accuracy at a given force angle is much less, however, than required with other methods.

Other embodiments of capacitive force sensors that provide advantages of reduced sensitivity to non-perpendicular forces increased sensitivity and higher signal to noise ratios, and rotational softening are now described with reference to FIGS. 8A, 8B, 9A, 9B, 10 and 11A–11C.

Figure 8A:
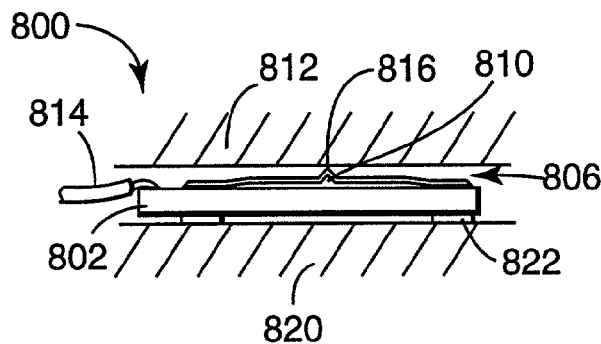
FIGS. 8A and 8B schematically illustrate an embodiment of a capacitive type of beam loading force sensor according to the present invention.
Figure 8B:
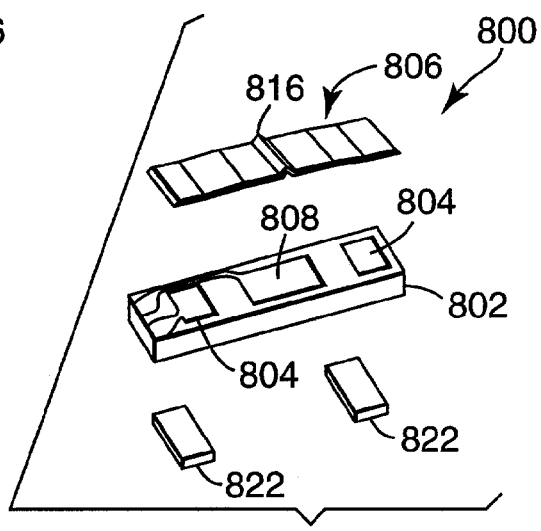

Referring first to FIGS. 8A and 8B, one particular embodiment of a force sensor 800 is formed from a substantially planar support member 802. An electrode pattern is formed on the support member 802 that includes one or more first electrodes 804 that connect to the spring member 806, and at least a second electrode 808. The spring member 806 is preferably mechanically resilient and electrically conductive. For example, the spring member may be formed from a metal or from a conductively coated insulator, such as a plastic. The support member 802 may be mounted to the underlying support surface 820 using any suitable method. For example, the support member 802 may be mounted using an acrylic tape 822 so as to provide lateral softening and flexural isolation.

A capacitive gap 810 is formed between the spring member 806 and the second electrode 808. The gap 810 may be formed by shaping the spring member 806 with a slight offset at each end, as shown. The spring member may, in a different approach, be formed without such offsets, and the gap established by spacing the spring member 806 from the second electrode 808 with a temporary shim, then reflowing the connections between the first electrodes 804 and the spring member 806 with solder. In another approach, the gap 810 may be formed using a solder that contains particles of a particular size so as to space the spring member 806 from the first electrodes 804.

When the spring member 806 is depressed under a force to the overlay 812, the width of the gap 810 is reduced, thus changing the capacitance measured between the first and second electrodes 804 and 808. Discrete wiring 814 provides electrical connection between the touch controller circuit and the electrodes 804 and 808 to permit measurement of the capacitance of the sensor 800. The spring member is provided with a pivoted force bearing 816 in the form of a ridge. This structure advantageously provides good strength against extreme overloads.

In one particular example, the spring member 806 may be formed from spring steel and may be approximately 250 μm thick (10 mils) and about 6 mm wide (0.25"). The spring member may be about 17 mm long (0.75") and pressed into shape on a die. The capacitive gap 810 may be about 125 μm (5 mils). The support member 802 may be formed from any suitable material, such as an epoxy glass PC board. The PC board 802 is typically of sufficient stiffness that a lateral softener, such as the acrylic tape 822 may be positioned between the support member 802 and the surface 820. The unloaded capacitance of such a structure is around 3 pF and the bottoming-out force is typically between about four and five pounds. It will be appreciated that the dimensions and particular materials are provided for illustration only and should not be taken as being limiting in any way. The dimensions of the sensor components should be selected based on the characteristics of the particular touch device being constructed.

This structure provides an advantage in that, should the surface 820 flex, the resulting curvature is poorly transmitted to the support member 802, thus reducing the effect that enclosure forces have on the measured forces.

Figure 9A:
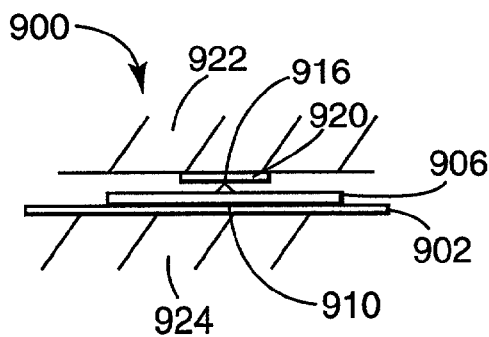
FIGS. 9A and 9B schematically illustrate another embodiment of a capacitive type of beam loading force sensor according to the present invention.
Figure 9B:
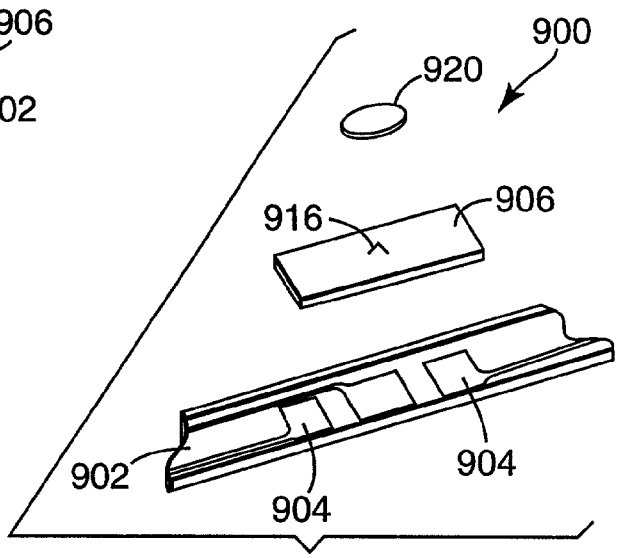

Referring now to FIGS. 9A and 9B, another embodiment 900 of a capacitive sensor includes a spring member 906 formed with an outwardly protruding dimple 916. FIG. 9A schematically illustrates the sensor 900 in situ, while FIG. 9B provides an exploded view of the sensor 900.

The spring member 906 is mounted on a support 902 that is provided with an electrode pattern including one or more first electrodes 904 and a second electrode 908. The spring member 906 is connected to, and spaced from, the first electrodes 904, for example using a technique similar to one of those described above with respect to sensor 800. A capacitive gap 910 is formed between the spring member 906 and the second electrode 908. A lateral softener 920 may be placed between the dimple 916 and the overlay 922 to provide lateral softening. The support member 902 is mounted on the surface 924.

In one particular example of the sensor 900, the spring member 906 is formed from spring steel 150 μm (6 mils) thick and is almost 6 mm (230 mils) long and about 3 mm (120 mils) wide. The spring member 906 may also be made from other materials and with different thicknesses. For example, the spring member 906 may be formed from phosphor-bronze that is 200 μm (8 mils) thick. The capacitive gap 910 may be 25 μm (1 mil) high. the bearing dimple 916 may be formed using a spring loaded center punch while the spring member 906 is pressed against a relatively deformable backing, for example aluminum. The free span of the spring member may be about 3.75 mm (150 mils), the central 2.15 mm (86 mils) of which opposes the second electrode 908. The unloaded capacitance of the sensor 900 is about three pF, and the bottoming-out force is between about three and four pounds.

Capacitive force sensors exhibit a change in capacitive reactance as a function of a change in applied force. For the sensors 800 and 900, this change is substantially linear for smaller forces, where the relative gap change is small. With larger forces, however, the center of the capacitive region closes up while the edges remain more widely spaced; this leads to a nonlinear drop in reactance that becomes more rapid than linear. Compensation for this nonlinear response characteristic may be accomplished in the processing of the sensor signal. In another approach, varied embodiments of the capacitive sensor may be provided which have an inherently greater range of linear reactance change. Thus another aspect of the invention is that the capacitive force sensor of nonuniform gap may provide improved linearity of measurement with simple processing of the signal, even where one or more capacitor plates are flexing in response to applied force.

One particular embodiment of a capacitive sensor with an extended linear response range is schematically illustrated in FIG. 10. The dimensions in the vertical direction are exaggerated in the figure so as to more clearly illustrate the sensor 1000. The sensor 1000 has a spring member 1006 that is provided with a controlled shape having a slight bend. The bend permits the ends 1006a and 1006b of the spring member 1006 to attach to the first electrodes 1004 with a minimal solder film while the center portion 1006c provides a maximum capacitive gap 1010 relative to the second electrode 1008. The first and second electrodes 1004 and 1008 are formed on the support 1002. There is a level of force that may be applied to the coupling 1014 which is just sufficient to first bring the spring member 1006 into contact with the second electrode 1008. The tapering of the capacitive gap 1010 between the spring member 1006 and the second electrode 1008 may be so shaped that contact tends to happen simultaneously at a number of points along the second electrode 1008. This reduces the nonlinearity of the sensor's response. Such a sensor is described in greater detail in U.S. patent application Ser. No. 09/835,040.

The spring member of the capacitive force sensor need not be rectangular as illustrated in FIGS. 8B and 9B, and need not be formed with uniform thickness. For example, the spring member may be shaped so that flexure is concentrated in specifically desired areas not serving as capacitor plates. This reduces flexure in the capacitive areas, thus increasing the linearity of the reactance change. Additional shapes and forms for the spring member are discussed further in U.S. patent application Ser. No. 09/835,040.

Capacitive sensors may be formed using a spring member made from an insulating material that is conductively coated in a certain area or areas. one particular example of such a sensor 1100 is described with reference to FIGS. 11A–11C. A region of material 1102, for example, epoxy glass PC board, forms a principal element 1106. The principal element 1106 includes lands 1107 and 1108, and such portions of the epoxy glass substrate as store significant elastic energy associated with changes in the capacitive gap.

As may be seen more clearly from the schematic cross-sectional view provided in FIG. 11B, a predefined path carries applied force from an overlay 1114, through a force-coupling elastomeric pad 1116, upper capacitor plate 1118, and spacing/connecting solder film 1120, to the central region 1122 of the principal element 1106. The central region 1122 is flanked by slots 1124 which serve both to increase and to relatively localize the flexure in the PC substrate. The force passes both out and around the ends of the slots 1124, eventually reaching the supports 1126. As force passes away from the immediate vicinity of the capacitive area and the slots 1124, any additional flexure ceases to relate to force-induced changes in the capacitive gap, and so is no longer passing through the force sensor. The supports 1126 are mounted to the surface 1128.

If present, supports 1126 placed close to the sensor may have some effect upon sensitivity and symmetry of response. Such close supports may be given a symmetrical disposition, such as that shown, not excessively close to central region 1122. More remote supports may be placed in any pattern desired.

The elastomeric pad 1116 provides both lateral softening and rotational softening. As such, the pad 1116 may provide the function of the dimple 914 and the lateral softener 920. The 1116 may be fastened adhesively to the capacitor plate 1118 below, but not attached above. Structures above the sensor 1100, such as the overlay 1126, may then be aligned and preloaded. In another approach, the pad 1116 offers the possibility of maintaining alignment and assembly through adhesive attachments both above and below.

Another embodiment 1150, schematically illustrated in FIG. 15C, shows an altered force path that passes through the length of the upper capacitor plate 1118. This upper plate 1118 may now make a significant contribution to the elastic energy storage associated with the capacitive gap; in which case, it is appropriate to view the upper plate 1118 as an additional spring member 1106a, working in concert with the lower principal element 1106, or spring member. Force passes from the spring member 1106a through the solder 1130 into the lower spring element 1106, continues around slots 1124, into central region 1122, and thence to support 1152.

It will be appreciated that many variations on the capacitive force sensor of the invention are possible. These are discussed further in U.S. patent application Ser. No. 09/835,040. One example of a variation of the embodiments discussed herein is that the pivot point may be attached to the under side of the overlay, rather than to the spring member of the force sensor. In another variation, the sensor may be mounted to the under side of the overlay, with the pivot contacted to the support surface.

As noted above, the present invention is applicable to touch screens and is believed to be particularly useful for reducing the sensitivity of force-based touch sensors on tangential forces. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

I claim:

1. A device for determining the position of a force applied to a touch screen, comprising:
    a touch member;
    a base support;
    a plurality of coupling units coupled between the touch member and the base support, the coupling units each including a beam member connected at peripheral portions to respective beam member supports, a center portion of the beam member being substantially unsupported relative to the periph&al portions, a force path passing force between the touch member and the base support, the force path extending between the center portion of the beam member and the peripheral portions of the beam member; and
    at least one sensor element associated with each coupling unit and disposed to measure a signal indicative of a force at the beam member location due to the force applied to the touch screen, the position of the force applied to the touch screen being determinable from the sensor element signals.

2. A device as recited in claim 1, wherein each coupling unit includes the at least one sensor element.

3. A device as recited in claim 1, wherein the beam member is elongated in a first direction and the elongated beam member has respective first and second ends at its peripheral portions.

4. A device as recited in claim 1, wherein the beam member is substantially disk-shaped having a disk periphery, and the peripheral portions include portions of the disk periphery.

5. A device as recited in claim 1, wherein each coupling unit further comprises a rotational softener disposed on a first surface of the beam member.

6. A device as recited in claim 5, wherein the rotational softener includes a protruding portion of the first surface of the beam member.

7. A device as recited in claim 5, wherein the rotational softener includes a portion of elastomeric material on the first surface of the beam member.

8. A device as recited in claim 1, wherein the beam member is disposed between the touch member and the beam member supports.

9. A device as recited in claim 8, wherein the beam member supports are integrally formed with the base support.

10. A device as recited in claim 1, wherein the beam member supports are disposed between the touch member and the beam member.

11. A device as recited in claim 10, wherein the beam member supports are integrally fomied with the touch member.

12. A device as recited in claim 1, wherein the at least one sensor element comprises at least one of the beam member supports formed from a force sensitive material.

13. A device as recited in claim 1, wherein the at least one sensor element includes a capacitor formed between the beam member and an electrode on the base support.

14. A device as recited in claim 1, wherein the beam member includes at least a metal surface to form a first plate of the capacitor movable relative to the electrode on the base support.

15. A device as recited in claim 14, wherein the beam member is formed from a metal material.

16. A device as recited in claim 14, wherein the beam member is formed from a non-conducting material upon which is disposed on a surface of the metal material.

17. A device as recited in claim 1, further comprising a lateral softener disposed between the touch member and the base support to permit lateral movement of the touch panel relative to the at least one sensor element.

18. A device as recited in claim 1, wherein the beam member spreads force received from the touch member to the peripheral portions over a distance greater than the thickness of the beam member.

19. A method of detecting the location of a touch on a touch screen having a touch member and an underlying support surface, comprising:
    isolating a twisting moment of one of the touch member and the underlying support surface from the other of the touch member and an underlying support surface;
    providing a plurality of force-sensitive devices coupled to the touch member, and for each device:
        passing at least a portion of a force applied to a first side of the touch member to one of i) a center portion of a force spreader disposed on a second side of the touch member, the center portion of the force spreader being substantially unsupported, and ii) peripheral portions of the force spreader;

spreading the portion of the applied force from the one of the i) the center portion of the force spreader and ii) the peripheral portions of the force spreader to the other of i) the center portion of the force spreader and ii) the peripheral portions of the force spreader; and measuring a signal indicative of the portion of the applied force passed to the force spreader; and using the signals measured from each device to determine the touch location.

20. A method as recited in claim 19, further comprising determining the location of the touch on the touch member from the signal measured in the measuring step.

21. A method as recited in claim 19, wherein measuring a signal indicative of the portion of the applied force includes sensing a displacement resulting from the applied force.

22. A method as recited in claim 19, further comprising determining a location of the touch applied to the touch member based on the signal measured in the measuring step.

23. A method as recited in claim 19, wherein isolating the twisting moment includes rotating a rotational bearing disposed between the touch member and the underlying support surface.

24. A method as recited in claim 19, wherein isolating the twisting moment includes rotating an elastomeric bearing disposed between the touch member and the underlying support surface.

25. A method as recited in claim 19, wherein spreading the portion of the applied force includes spreading the portion of the applied force over a distance greater than a thickness of the force spreader.

26. A method as recited in claim 19, wherein measuring a signal indicative of the portion of the applied force includes compressing a force sensitive material and detecting a resulting change in a characteristic of the force sensitive material.

27. A method as recited in claim 19, wherein measuring a signal indicative of the portion of the applied force includes changing capacitance of a capacitor and measuring the change in capacitance.

28. A method as recited in claim 27, wherein the force spreader forms one conductive suiface of the capacitor and changing capacitance of the capacitor includes moving the force spreader relative to a second conductive surface of the capacitor.

29. A method as recited in claim 19, further comprising isolating the force spreader from tangential forces applied to the touch member.

30. A method as recited in claim 29, wherein isolating the force spreader from tangential forces includes disposing a lateral softener between the touch member and an underlying support surface.

31. A method as recited in claim 19, further comprising displaying an image to a user through the touch member.

32. A method as recited in claim 31, further comprising determining a location of a touch on the touch screen and changing the image in response to the determined location of the touch.

33. A method as recited in claim 31, further comprising displaying the image through the touch screen.

34. A method as recited in claim 31, further comprising displaying the image from an image display on the touch screen.

35. A system for detecting the location of a force applied to a first side of a touch member, comprising:
a plurality of force spreading means disposed on a second side of the touch member;
means for passing at least a portion of a force applied to a first side of the touch member to a center portion of each force spreading means, the center portion of each force spreading means being substantially unsupported, each force spreading means passing the portion of the applied force between the center portion and the peripheral portions of each force spreading means; and
means for measuring a signal indicative of the portion of the applied force passed to each force spreading means.

36. A touch panel system for determining the location of a touch on the touch panel, comprising:
a base support;
a touch member coupled to the base support via a plurality of coupling units, each of the coupling units coupling between the touch member and the base support, the coupling units each including:
a beam member connected at peripheral portions to respective beam member supports, a center portion of the beam member being substantially unsupported relative to the peripheral portions, a force path passing force between the touch member and the base support, the force path passing between the center portion of the beam member and the peripheral portions of the beam member; and
at least one sensor element associated with each coupling unit and disposed to measure a signal indicative of a force at the beam member location; and
a touch panel controller coupled to receive signals from the at least one sensor elements and to determine a location of a touch on the touch panel.

37. A system as recited in claim 36, further comprising a display unit disposed to display an image to a user, and a display controller coupled to the display unit to control the image.

38. A system as recited in claim 37, wherein the display unit is disposed below the touch panel and displays the image to the user through the touch member.

39. A system as recited in claim 37, wherein the touch panel comprises the display unit.

40. A system as recited in claim 37, further comprising a processor unit coupled to the touch panel controller and the display controller to process information displayed on the display unit and infonnation received from the touch panel controller.

41. A device for locating the position of a touch on a touch screen, comprising:
a touch member;
a receiving structure;
a plurality of force spreading members each having a concentrated force receiving region coupled to receive a force passed into the force spreading members from the touch member, and each having a force distributing region to pass the force out of the force spreading members to the receiving structure, the force distributing region having a larger area than the force receiving region, the receiving structure and force spreading members being arranged so that changes in curvature of the force spreading members arising from the force maintain loading of the force spreading through the force spreader while the force remains within a measurement range, so as to spread the force within the spreading members to substantially all of the distributing region; and
a sensing element disposed to detect a signal indicative of the force passing through the force spreading members.

42. A device as recited in claim 41, wherein the force receiving region is on a first side of each force spreading member and the force distributing region is on a second side of each force spreading member opposite the first side.

43. A device as recited in claim 42, wherein at least a portion of the force passing through the force spreading members passes in a direction perpendicular to the first and second surfaces.

44. A device as recited in claim 41, wherein the receiving structure is arranged to prevent contact with the force spreading members proximate the force receiving region, when the force is within the force measurement range.

45. A device as recited in claim 41, wherein the sensing element senses a displacement arising from the force.

46. A device as recited in claim 41, wherein the sensing element is responsive to flexure of the force spreading members.

47. A device as recited in claim 41, wherein the receiving structure includes a cushion of low modulus material contacting the force spreading members proximate the force receiving region.

48. A device as recited in claim 47, wherein the receiving structure includes the force sensing element and the force sensing element passes force from the distributing region of the force spreading members to the cushion of low modulus material.

49. A device as recited in claim 41, further comprising a touch controller coupled to receive signals from the sensing element and to determine a location of a touch on the touch panel.

50. A device as recited in claim 49, further comprising a processor connected to receive position information from the touch controller and a display connected to receive display information from the processor.

51. A device as recited in claim 50, wherein the display is disposed below the touch panel to display the information through the touch panel to a viewer.

52. A device as recited in claim 50, wherein the touch panel comprises the display.

53. A system for locating a touch on a touch screen, comprising:
a touch member;
a base support;
a plurality of coupling assemblies coupled between a coupling region of the touch member and the base support, the coupling assemblies being rotationally unconstrained relative to one of the touch member and the base support, the coupling assemblies each including a beam member having a predominant plane, the beam member including a first region coupled to receive force from the touch member, the beam member further including at least one second region, the beam member receiving the force in a direction perpendicular to the predominant plane and passing the force laterally to the at least one second region, the force passing out of the beam member through the at least one second region towards a beam member support of the coupling assembly, and
a sensor element associated with each coupling assembly and responsive to the force perpendicular to the predominant plane.

54. An assembly as recited in claim 53, wherein the sensor element forms part of the beam member support and the sensor element is disposed between the beam member and the base support to receive force from the at least one second region.

55. An assembly as recited in claim 53, wherein the sensor element forms part of the beam member support and the sensor element is disposed between the touch member and the beam member to receive force from the touch member.

56. An assembly as recited in claim 53, wherein sensor element produces a detection signal in response to flexure of the beam member.

57. An assembly as recited in claim 53, wherein each coupling assembly further comprises a pivot disposed between the touch member and the first region of the beam member.

58. An assembly as recited in claim 53, wherein each coupling assembly further comprises a coupling block of relatively low Young's modulus material disposed between the touch member and the first region of the beam member.

59. An assembly as recited in claim 53, further comprising a touch controller coupled to receive signals from the force sensing elements and to determine a location of a touch on the touch panel.

60. An assembly as recited in claim 59, further comprising a processor connected to receive position information from the touch controller and a display connected to receive display information from the processor.

61. An assembly as recited in claim 60, wherein the display is disposed below the touch member to display the information through the touch member to a viewer.

62. An assembly as recited in claim 60, wherein the touch member comprises the display.

* * * * *

UNITED STATES PATENT AND TRADEMARK OFFICE
CERTIFICATE OF CORRECTION

PATENT NO. : 7,196,694 B2
APPLICATION NO. : 10/121507
DATED : March 27, 2007
INVENTOR(S) : Jerry B. Roberts It is certified that error appears in the above-identified patent and that said Letters Patent is hereby corrected as shown below:

Column 13,
Line 14, delete "3 pF" and insert -- 3pF -- therefor.

Column 15,
Line 55, delete "periph&al" and insert -- peripheral --, therefor.

Column 16,
Line 28, delete "fomied" and insert -- formed --, therefor.

Column 17,
Line 42, delete "suiface" and insert -- surface --, therefor.

Column 18,
Line 43, delete "infonnation" and insert -- information --, therefor.

Signed and Sealed this

Thirty-first Day of July, 2007

JON W. DUDAS
*Director of the United States Patent and Trademark Office*